United States Patent
Lee et al.

(10) Patent No.: US 9,358,893 B2
(45) Date of Patent: Jun. 7, 2016

(54) CHARGING APPARATUS AND ELECTRIC VEHICLE INCLUDING THE SAME

(71) Applicant: LG Electronics Inc., Seoul (KR)

(72) Inventors: Dongcheol Lee, Seoul (KR); Yohan Park, Seoul (KR); Junyoung Lim, Seoul (KR); Murat Senol, Seoul (KR); Rik De Doncker, Leuven (BE)

(73) Assignee: LG Electronics Inc., Seoul (KR)

( * ) Notice: Subject to any disclaimer, the term of this patent is extended or adjusted under 35 U.S.C. 154(b) by 16 days.

(21) Appl. No.: 14/173,337

(22) Filed: Feb. 5, 2014

(65) Prior Publication Data
US 2014/0217973 A1     Aug. 7, 2014

(30) Foreign Application Priority Data

Feb. 6, 2013   (KR) .......................... 10-2013-0013516

(51) Int. Cl.
*B60L 11/18*     (2006.01)
(52) U.S. Cl.
CPC .......... *B60L 11/1811* (2013.01); *B60L 11/1812* (2013.01); *B60L 11/1814* (2013.01); *B60L 2220/54* (2013.01); *Y02T 10/641* (2013.01); *Y02T 10/7005* (2013.01); *Y02T 10/7072* (2013.01); *Y02T 90/127* (2013.01); *Y02T 90/14* (2013.01)

(58) Field of Classification Search
CPC ............ B60L 11/1814; B60L 11/1811; B60L 11/1812
USPC ......................................................... 320/109
See application file for complete search history.

(56) References Cited

U.S. PATENT DOCUMENTS

| 7,795,844 | B2 | 9/2010 | Ichikawa |
|---|---|---|---|
| 7,891,451 | B2 | 2/2011 | Oyobe |
| 8,478,469 | B2 * | 7/2013 | Ueo et al. .................. 701/22 |
| 8,558,492 | B2 | 10/2013 | Oh |

(Continued)

FOREIGN PATENT DOCUMENTS

| CN | 102684283 A | 9/2012 |
|---|---|---|
| GB | 1256679 A | 12/1971 |

(Continued)

OTHER PUBLICATIONS

Chinese Office Action dated Jul. 23, 2015, on Chinese Application No. 201410045311.X, 5 pages.

(Continued)

*Primary Examiner* — Sun Lin
(74) *Attorney, Agent, or Firm* — Fish & Richardson P.C.

(57) ABSTRACT

A charging apparatus and an electric vehicle including the same are disclosed. The charging apparatus includes a converter for, in a charging mode, converting an input alternating current (AC) voltage into a direct current (DC) voltage and a controller for controlling the converter. The converter includes a motor and a switching unit that is connected to an additional coil wound on a stator of one phase of the motor, and that supplies the input AC voltage to the motor by performing a switching operation. The converter also includes an inverter that, in a motor operation mode, converts a DC voltage from a battery into an AC voltage by a switching operation and drives the motor. In the charging mode, the inverter converts the input AC voltage into the DC voltage using the additional coil of the motor and the switching unit and supplies the DC voltage to the battery.

20 Claims, 7 Drawing Sheets

(56) References Cited

U.S. PATENT DOCUMENTS

| | | | |
|---|---|---|---|
| 8,736,101 B2* | 5/2014 | Masuda et al. | 307/10.1 |
| 8,810,060 B2* | 8/2014 | Kamaga | 307/9.1 |
| 8,872,473 B2* | 10/2014 | Song et al. | 320/109 |
| 8,901,882 B2* | 12/2014 | Song et al. | 320/109 |
| 2009/0079389 A1 | 3/2009 | Ohtomo | |
| 2010/0318250 A1* | 12/2010 | Mitsutani | 701/22 |
| 2011/0279083 A1 | 11/2011 | Asai | |
| 2013/0134909 A1* | 5/2013 | Lee | 318/139 |
| 2013/0193923 A1 | 8/2013 | Kimura | |
| 2014/0021918 A1 | 1/2014 | Ichikawa | |
| 2014/0217973 A1 | 8/2014 | Lee | |
| 2014/0217974 A1* | 8/2014 | Kim et al. | 320/109 |
| 2014/0253034 A1 | 9/2014 | Kurimoto | |
| 2015/0175026 A1 | 6/2015 | Uyeki | |

FOREIGN PATENT DOCUMENTS

| | | |
|---|---|---|
| JP | 2005-130638 A | 5/2005 |
| JP | 2007-068362 A | 3/2007 |
| JP | 2009-065808 A | 3/2009 |
| KR | 10-1999-0074138 A | 10/1999 |
| KR | 10-2012-0106457 A | 9/2012 |

OTHER PUBLICATIONS

Korean Notice of Allowance dated Nov. 2, 2015, for Korean Application No. 10-2013-0013516, 4 pages.

* cited by examiner $S_1$ on $S_1$ off

CHARGING APPARATUS AND ELECTRIC VEHICLE INCLUDING THE SAME

CROSS-REFERENCE TO RELATED APPLICATION

This application claims the priority benefit of Korean Patent Application No. 10-2013-0013516, filed on Feb. 6, 2013, in the Korean Intellectual Property Office, the disclosure of which is incorporated herein by reference.

FIELD

The present disclosure relates to a charging apparatus and an electric vehicle including the same.

BACKGROUND

A vehicle with an internal combustion engine may lead to environmental pollution or exhaustion of energy due to consumption of energy. Instead of a vehicle using solely an internal combustion engine as a power source, an electric vehicle using electricity as a power source and a hybrid vehicle using an internal combustion engine and electricity have been developed.

Such an electric vehicle or hybrid vehicle generates output using a motor and a battery and various attempts have been made to improve output and mileage.

SUMMARY

In one aspect, a charging apparatus includes a converter configured to, in a charging mode, receive an input alternating current (AC) voltage and convert the input AC voltage into an output direct current (DC) voltage and a controller configured to control the converter. The converter includes a motor that includes a stator and coils wound on the stator with the coils corresponding to different phases of the motor. The converter also includes an additional coil wound on a portion of the stator that corresponds to a phase of the different phases of the motor and a switching unit connected to the additional coil and configured to selectively supply the input AC voltage to the motor by performing a switching operation. The converter further includes an inverter configured to, in a motor operation mode, convert a battery DC voltage from a battery into an output AC voltage by performing a switching operation of three-phase switching elements and drive the motor, and, in the charging mode, convert the input AC voltage into the output DC voltage using the additional coil of the motor and the switching unit and supply the output DC voltage to the battery.

Implementations may include one or more of the following features. For example, in the charging mode, a switching element of the switching unit, the motor, and the inverter may operate as a flyback converter. In addition, energy may be stored in the additional coil by turning a switching element of the switching unit on and the stored energy may be converted into the output DC voltage via the inverter and supplied to the battery by turning the switching element of the switching unit off.

In the charging mode, the additional coil of the motor may operate as a primary side of a transformer and a phase coil wound on the portion of the stator that corresponds to the phase of the different phases of the motor may operate as a secondary side of the transformer. And, the controller may be configured to, in the charging mode, control turning on and off of a switching element of the switching unit. Further, the converter may include a rectifier configured to rectify the input AC voltage and supply the rectified voltage to the motor In some implementations, the inverter, the controller, and the converter may be located on the same circuit board. In these implementations, the controller may be configured to, in the charging mode, turn off all of the three-phase switching elements of the inverter.

In some examples, the controller may include a speed calculator configured to calculate rotator speed information of the motor based on a location signal of the rotator of the motor and a current command generator configured to generate a current command value based on the speed information and a speed command value. In these examples, the controller also may include a voltage command generator configured to generate a voltage command value based on the current command value and detected current flowing in the motor and a switching control signal output unit configured to output a switching control signal that drives the inverter based on the voltage command value.

In some implementations, the controller may be configured to control a duty ratio of turning on the switching unit to perform a voltage boosting operation based on a first voltage across a first capacitor located between the motor and a rectifier of the converter being less than a second voltage across a second capacitor located between the inverter and the battery. In these implementations, the controller may be configured to control the duty ratio of turning on the switching unit to perform a voltage drop operation based on the first voltage across the first capacitor being greater than the second voltage across the second capacitor.

In another aspect, an electric vehicle includes a battery and a charging apparatus including a converter configured to, in a charging mode, receive an input alternating current (AC) voltage and convert the input AC voltage into an output direct current (DC) voltage and a controller configured to control the converter. The converter includes a motor that includes a stator and coils wound on the stator with the coils corresponding to different phases of the motor. The converter also includes an additional coil wound on a portion of the stator that corresponds to a phase of the different phases of the motor and a switching unit connected to the additional coil and configured to selectively supply the input AC voltage to the motor by performing a switching operation. The converter further includes an inverter configured to, in a motor operation mode, convert a battery DC voltage from a battery into an output AC voltage by performing a switching operation of three-phase switching elements and drive the motor, and, in the charging mode, convert the input AC voltage into the output DC voltage using the additional coil of the motor and the switching unit and supply the output DC voltage to the battery.

Implementations may include one or more of the following features. For example, in the charging mode, a switching element of the switching unit, the motor, and the inverter may operate as a flyback converter. In addition, the charging apparatus may store energy in the additional coil by turning a switching element of the switching unit on, and may convert the stored energy into the output DC voltage via the inverter and supply the converted DC voltage to the battery by turning the switching element of the switching unit off.

In the charging mode, the additional coil of the motor may operate as a primary side of a transformer and a phase coil wound on the portion of the stator that corresponds to the phase of the different phases of the motor may operate as a secondary side of the transformer. And, the controller may be configured to, in the charging mode, turn on and off all of the three-phase switching elements of the switching unit. Further, the converter may include a rectifier configured to rectify the input AC voltage and supply the rectified voltage to the motor.

In some implementations, the inverter, the controller, and the switching unit may be located on the same circuit board. In these implementations, the controller may be configured to, in the charging mode, turn off all of the three-phase switching elements of the inverter.

In some examples, the controller may include a speed calculator configured to calculate rotator speed information of the motor based on a location signal of the rotator of the motor and a current command generator configured to generate a current command value based on the speed information and a speed command value. In these examples, the controller may include a voltage command generator configured to generate a voltage command value based on the current command value and detected current flowing in the motor and a switching control signal output unit configured to output a switching control signal that drives the inverter based on the voltage command value.

In some implementations, the controller may be configured to control a duty ratio of turning on the switching unit to perform a voltage boosting operation based on a first voltage across a first capacitor located between the motor and a rectifier of the converter being less than a second voltage across a second capacitor located between the inverter and the battery. In these implementations, the controller may be configured to control the duty ratio of turning on the switching unit to perform a voltage drop operation based on the first voltage across the first capacitor being greater than the second voltage across the second capacitor.

DETAILED DESCRIPTION

Figure 1:
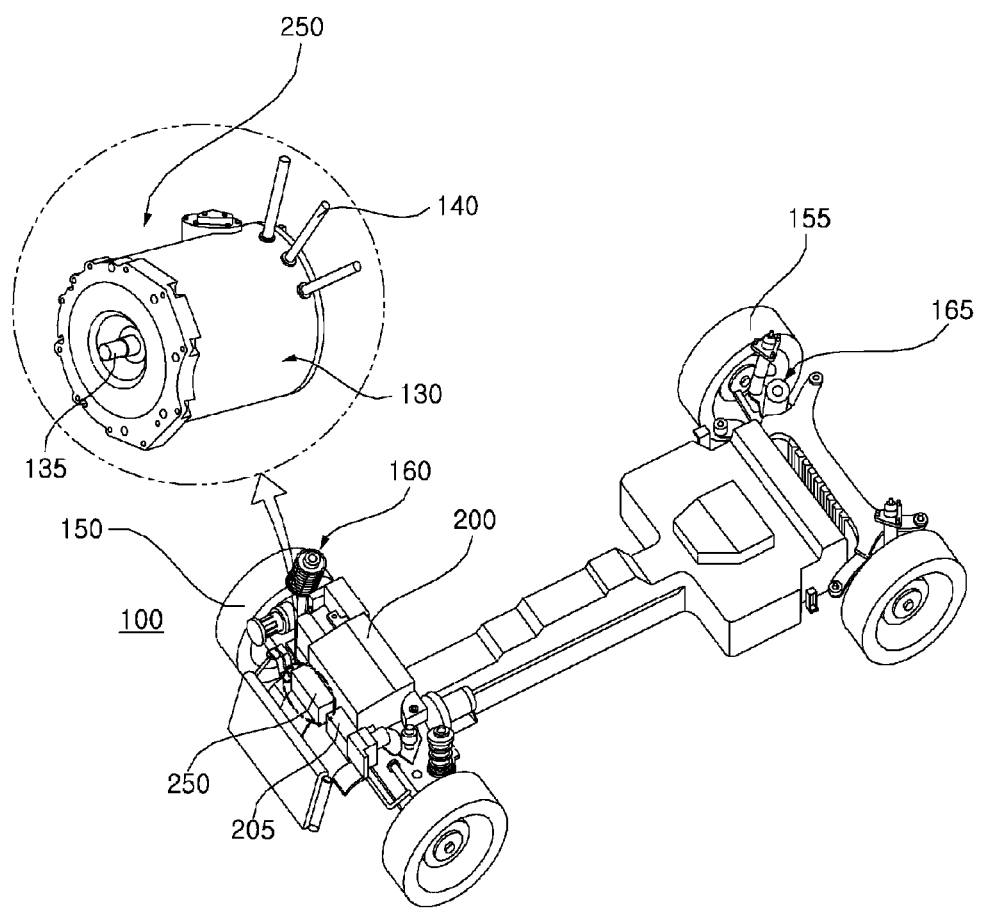
FIG. 1 is a schematic diagram showing an example of the body of an example electric vehicle.

FIG. 1 illustrates an example body of an example electric vehicle.

Referring to FIG. 1, the electric vehicle 100 may include a battery 205 for supplying a voltage, and a motor driving unit 200 for receiving a voltage from the battery 205 and driving a motor 250. The motor 250 is rotated by the motor driving unit 200. Front wheels 150 and rear wheels 155 are rotated by the motor 250, and front-wheel and rear-wheel suspensions 160 and 165 reduce (e.g., prevent) vibrations of the road from being delivered to the vehicle body. The electric vehicle may further include a driving gear for changing the rotation speed of the motor 250 according to a gear ratio.

The battery 205 supplies a voltage to the motor driving unit 200. In particular, the battery supplies a direct current (DC) voltage to a capacitor C of the motor driving unit 200.

The battery 205 may be formed of a set of a plurality of unit cells. The plurality of unit cells may be managed by a battery management system (BMS) in order to maintain a constant voltage. That is, the plurality of unit cells may output a constant voltage by the BMS.

For example, the BMS may detect a voltage $V_{bat}$ of the battery 205 and send the voltage $V_{bat}$ to an electronic controller, such as a controller 430 (see FIG. 2) of the motor driving unit 200. If the voltage $V_{bat}$ of the battery is decreased to a lower limit value or less, the BMS may supply the DC voltage stored in the capacitor C of the motor driving unit 200 to the battery. In addition, if the voltage $V_{bat}$ of the battery is increased to an upper limit value or more, the BMS may supply a DC voltage to the capacitor C of the motor driving unit 200.

The battery 205 may be composed of a secondary battery for charging or discharging. Other arrangements also are possible.

The motor driving unit 200 receives a DC voltage from the battery 205 via a power input cable in a motor operation mode. The motor driving unit 200 converts the DC voltage received from the battery 205 into an alternating current (AC) voltage and supplies the AC voltage to the motor 250. The converted AC voltage may be a three-phase AC voltage.

The motor driving unit 200 supplies the three-phase AC voltage to the motor 250 via a three-phase output cable included in the motor driving unit 200 in the motor operation mode. Although the motor driving unit 200 may have a three-phase output cable composed of three cables, three cables may be included in a single cable.

The motor driving unit 200 may receive an input AC voltage, convert the input AC voltage into a DC voltage, and supply the DC voltage to the battery 205, in a charging mode. Thus, the motor driving unit 200 may be referred to as a charging apparatus.

In the present specification, the motor driving unit 200 and the charging apparatus are used interchangeably and have the same meaning.

The motor 250 includes a stator 130 and a rotator 135. The motor 250 includes an input cable 140 and receives an AC voltage from the motor driving unit 200. The motor 250 may be a three-phase motor, for example. If a variable voltage/variable frequency AC voltage of each phase is applied to a coil of the stator of each phase, the rotation speed of the rotator is changed according to applied frequency.

The motor 250 may include various motors such as an induction motor, a blushless DC motor (BLDC), a reluctance motor, etc.

The driving gear may be provided on one side of the motor 250. The driving gear converts rotation energy of the motor 250 according to gear ratio. The rotation energy output from the driving gear is delivered to the front wheels 150 and/or the rear wheels 155 to move the electric vehicle 100.

The front-wheel suspension 160 and the rear-wheel suspension 165 support the front wheels 150 and the rear wheels 155, respectively. The front-wheel suspension 160 and the rear-wheel suspension 165 support the wheels by a spring or a damper in a vertical direction such that vibrations of the road do not reach the vehicle body.

The front wheels 150 may include a steering apparatus. The steering apparatus steers the front wheels 150 such that a driver steers the electric vehicle 100 in a desired direction.

In some implementations, the electric vehicle 100 may include an electronic controller for controlling electronic apparatuses included in the electric vehicle. The electronic controller controls operation and display of each apparatus. In addition, the electronic controller may control the BMS.

The electronic controller may generate a driving command value according to various driving modes (forward mode, backward mode, neutral mode and parking mode), based on sensed signals from an inclination angle sensor for sensing an inclination angle of the electric vehicle 100, a speed sensor for sensing the speed of the electric vehicle 100, a brake sensor for sensing operation of a brake pedal and an accelerator sensor for sensing operation of an accelerator pedal. The driving command value may be a torque command value or a speed command value, for example.

The electric vehicle 100 may include an electric vehicle using a battery and a motor and a hybrid electric vehicle using a battery and a motor while using an engine. The hybrid electric vehicle may further include a switch for selecting any one of the battery and the engine and a transmission. A method for driving the hybrid electric vehicle may be divided into a serial method for converting mechanical energy output from the engine into electric energy to drive the motor and a parallel method for simultaneously utilizing mechanical energy output from the engine and electric energy of the battery.

The motor driving unit 200 will be described below with reference to FIG. 2 and subsequent figures thereof.

Figure 2:
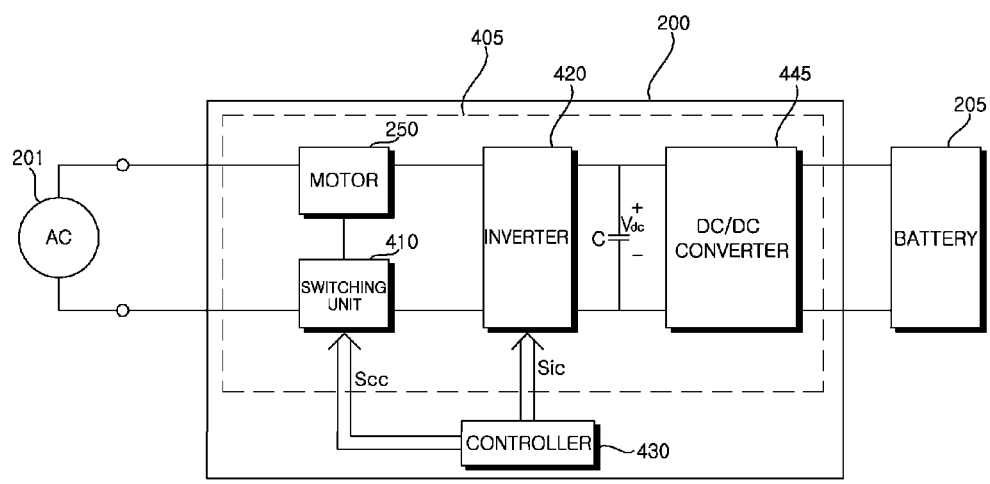
FIG. 2 is a block diagram showing an example of the internal configuration of a driving unit of FIG. 1.
Figure 3:
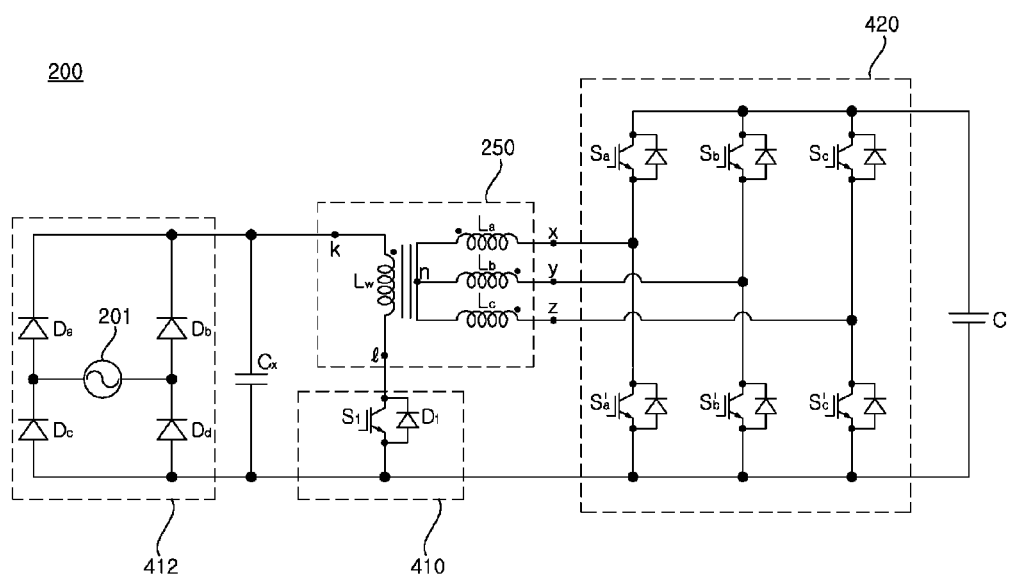
FIG. 3 is a circuit diagram of an example of the driving unit of FIG. 2.

FIG. 2 shows an example of the internal configuration of the driving unit of FIG. 1, and FIG. 3 illustrates example circuitry of the driving unit of FIG. 2.

The motor driving unit 200, that is, the charging apparatus 200, may include a converter 405 and a controller 430. The converter 405 may include a switching unit 410, a motor 250, an inverter 420 and a DC/DC converter 445. Here, the DC/DC converter 445 may be selectively included.

The switching unit 410 is provided at a front stage of the motor 250 and includes a switching element $S_1$ to supply a voltage from an input AC power source 201 to the motor 250 by a switching operation of the switching element.

Although the input AC power source 201 is a single-phase AC power source in FIG. 2, the input AC power source may be a three-phase AC power source.

A rectifier (412 of FIG. 3) for rectifying the voltage from the input AC power source 201 may be further provided at a front stage of the switching unit 410.

In FIG. 3, as the rectifier 412 of the single-phase AC voltage, four diodes $D_a$, $D_b$, $D_c$ and $D_d$ are used in the form of a bridge.

The switching unit 410 may additionally be connected to an additional coil wound on a stator of any one phase of the motor 250. A capacitor $C_x$ for smoothing the rectified voltage may be further provided between the motor 250 and the rectifier 412, that is, between the switching unit 410 and the rectifier 412.

FIG. 3 shows an example of an equivalent circuit of the motor 250. The three-phase motor 250 may be electrically expressed by an a-phase inductor $L_a$, a b-phase inductor $L_b$ and a c-phase inductor $L_c$.

The switching unit 410 may operate as a flyback converter, along with the motor 250 and, more particularly, the additional coil of the motor.

In FIG. 3, as the rectifier 412 of the single-phase AC voltage, four diodes $D_a$, $D_b$, $D_c$ and $D_d$ are used in the form of a bridge.

The switching element $S_1$ is electrically connected between the rectifier 412 and the motor 250 and, more particularly, between the rectifier 412 and the additional coil wound on the stator of any one phase of the motor 250, thereby performing a switching operation.

In the charging mode, by turning the switching element $S_1$ on, the voltage from the rectifier 412 is delivered to the additional coil of the motor 250 such that energy is stored in the additional coil. At this time, all the switching elements of the inverter 420 are turned off.

In the charging mode, by turning the switching element $S_1$ off, the voltage from the rectifier 412 is no longer delivered to the additional coil of the motor 250 but the energy stored in the additional coil may be delivered to the battery 205 via the inverter 420. At this time, all the switching elements of the inverter 420 are turned off, but the diodes may be conducted in one direction, and the diodes in the inverter 420 may supply the current to the battery.

By the turn-on/off operation of the switching element $S_1$, the input AC voltage is converted into DC voltage.

Although a general flyback converter includes an inductor, the switching unit 410 does not include an inductor and uses the phase coil and the additional coil wound on the stator 130 of the motor 250 as the inductor.

The switching element $S_1$ of the switching unit 410 may be controlled by a switching control signal $S_{cc}$ of the controller 430.

An input current detector may be provided between the rectifier 412 and the input AC power source 201. In addition, an input voltage detector may be provided across a capacitor $C_x$ of the switching unit 410.

The input current detector may detect input AC current received from the input AC power source 201. As the input current detector, a current transformer (CT), a shunt resistor, etc. may be used. The detected input AC current may be input to the controller 430 as a discrete signal having a pulse shape.

The input voltage detector may detect a voltage across the capacitor $C_x$. The input voltage detector may include a resistor, an amplifier, etc. The detected input voltage may be input to the controller 430 as a discrete signal having a pulse shape.

The inverter 420 includes a plurality of inverter switching elements, which may convert a DC voltage $V_{dc}$ smoothed by an on/off operation of the switching elements into three-phase AC voltages va, vb and vc having a predetermined frequency and output the three-phase AC voltages to the three-phase synchronization motor 250.

In the inverter 420, upper-arm switching elements $S_a$, $S_b$ and $S_c$ and lower-arm switching elements $S'_a$, $S'_b$ and $S'_c$, connected in series form respective pairs and a total of three pairs of upper-arm and lower-arm switching elements $S_a$&$S'_a$ $S_b$&$S'_b$ and $S_c$&$S'_c$ are connected in parallel. The switching elements $S_a$, $S'_a$, $S_b$, $S'_b$, $S_c$ and $S'_c$, are connected with diodes in inverse parallel.

The switching elements of the inverter 420 perform the on/off operation based on an inverter switching control signal $S_{ic}$ from the controller 430.

The inverter 420 converts the DC voltage from the battery to the AC voltage and drives the motor 250 in the operation mode of the motor 250.

In the inverter 420, all the three-phase switching elements $S_a$, $S'_a$, $S_b$, $S'_b$, $S_c$ and $S'_c$ of the inverter 420 are turned off in the charging mode.

The switching element $S_1$ of the switching unit 410 is turned on such that the a-phase upper-arm diode $D_{sa}$ connected to the a-phase upper-arm switching element in inverse parallel is turned off, and the switching element $S_1$ of the switching unit 410 is turned off such that the a-phase upper-arm diode $D_{sa}$ connected to the a-phase upper-arm switching element in inverse parallel is turned on.

Therefore, in the charging mode, the voltage from the input AC power source 201 may be converted into the DC voltage through the switching unit 410, the motor 250 and the switching element of one phase of the inverter 420, that is, the diode connected to the switching element of one phase in inverse parallel, and may be supplied to the battery 205, which will be described in more detail below with reference to FIG. 4.

The controller 430 may control the operation of the switching elements of the inverter 420. The controller 430 may receive output current detected by the output current detector (E of FIG. 7).

The controller 430 outputs the inverter switching control signal $S_{ic}$ to the inverter 420 in order to control the switching operation of the inverter 420. The inverter switching control signal $S_{ic}$ is a pulse width modulation (PWM) switching control signal and is generated and output based on the output current value detected by the output current detector E.

The controller 430 may control the switching operation of the switching element $S_1$ of the switching unit 410 in the charging mode. The controller 430 may receive input current detected by the input current detector. The controller 430 may output the converter switching control signal $S_{cc}$ to the switching unit 410 in order to control the switching operation of the switching unit 410. The converter switching control signal $S_{cc}$ is a pulse width modulation (PWM) switching control signal and is generated and output based on the input current detected by the input current detector.

The output current detector (E of FIG. 7) may detect output current flowing between the inverter 420 and the three-phase motor 250, that is, current flowing in the motor 250. The output current detector E may detect output currents $i_a$, $i_b$ and $i_c$ of respective phases or detect output currents of two phases using ternary phase equilibrium.

The output current detector E may be provided between the inverter 420 and the motor 250. For current detection, a current transformer (CT), a shunt resistor, etc. may be used.

If shunt resistors are used, three shunt resistors may be provided between the inverter 420 and the synchronization motor 250 or one end of each of the three shunt resistors may be connected to each of the three lower-arm switching elements, $S'_a$, $S'_b$ and $S'_c$ of the inverter 420. Alternatively, two shunt resistors may be used using ternary phase equilibrium. If one shunt resistor is used, the shunt resistor may be provided between the capacitor C and the inverter 420.

The detected output current is a discrete signal having a pulse shape and may be applied to the controller 430. Based on the detected output current, the inverter switching control signal $S_{ic}$ is generated. Hereinafter, assume that the detected output current is three-phase output currents $i_a$, $i_b$ and $i_c$.

The DC/DC converter 445 may be a bi-directional converter. That is, in the motor driving mode, the level of the DC voltage stored in the battery 205 is changed and the level-changed DC voltage is output to the inverter 420. In the charging mode, the level of the generated DC voltage may be changed and the level-changed DC voltage may be sent to the battery 205 by the switching operation of the inverter 420.

The DC/DC converter 445 may not be included in the driving unit 200.

The capacitor C for storing the DC voltage may be provided between the inverter 420 and the battery 205. The capacitor C may serve as a smoothing capacitor and the smoothing capacitor C may smooth the input voltage and store the smoothed voltage.

Although one smoothing capacitor C is shown in the figure, a plurality of capacitors may be included for stability.

In FIG. 3, the capacitor C is provided between the inverter 420 and the DC/DC converter 445.

Both ends of the capacitor C may be referred to as DC ends or DC link ends, because a DC voltage is stored.

The driving unit 200 may further include a DC end voltage detector for detecting the voltage between both ends of the capacitor C.

The DC end voltage detector may detect a DC end voltage $V_{dc}$ between both ends of the smoothing capacitor C. The DC end voltage detector may include a resistor, an amplifier, etc. The detected DC end voltage $V_{dc}$ may be a discrete signal having a pulse shape and may be input to the controller 430.

If the DC/DC converter 445 is not provided between the inverter 420 and the battery 205, the DC end voltage $V_{dc}$ detected by the DC end voltage detector may correspond to the voltage $V_{BAT}$ of the battery 205.

The controller 430 may determine voltage boosting or voltage drop in the charging mode using the DC end voltage $V_{dc}$ and the input voltage corresponding to the voltage $V_{BAT}$ of the battery 205.

The switching unit 410, the inverter 420 and the controller 430 are included in the driving unit 200, that is, the charging apparatus 200, and may be located on the same circuit board. Such a charging apparatus may be referred to as an on board charger (OBC). The inverter, the controller and the switching unit of the charging apparatus are provided on the same circuit board, thereby implementing a small-size charging apparatus.

In addition to the switching unit 410, the inverter 420, and the controller 430, the DC/DC converter 445 may be included in the driving unit 200, that is, the charging apparatus 200, and may be located on the same circuit board.

Figure 4:
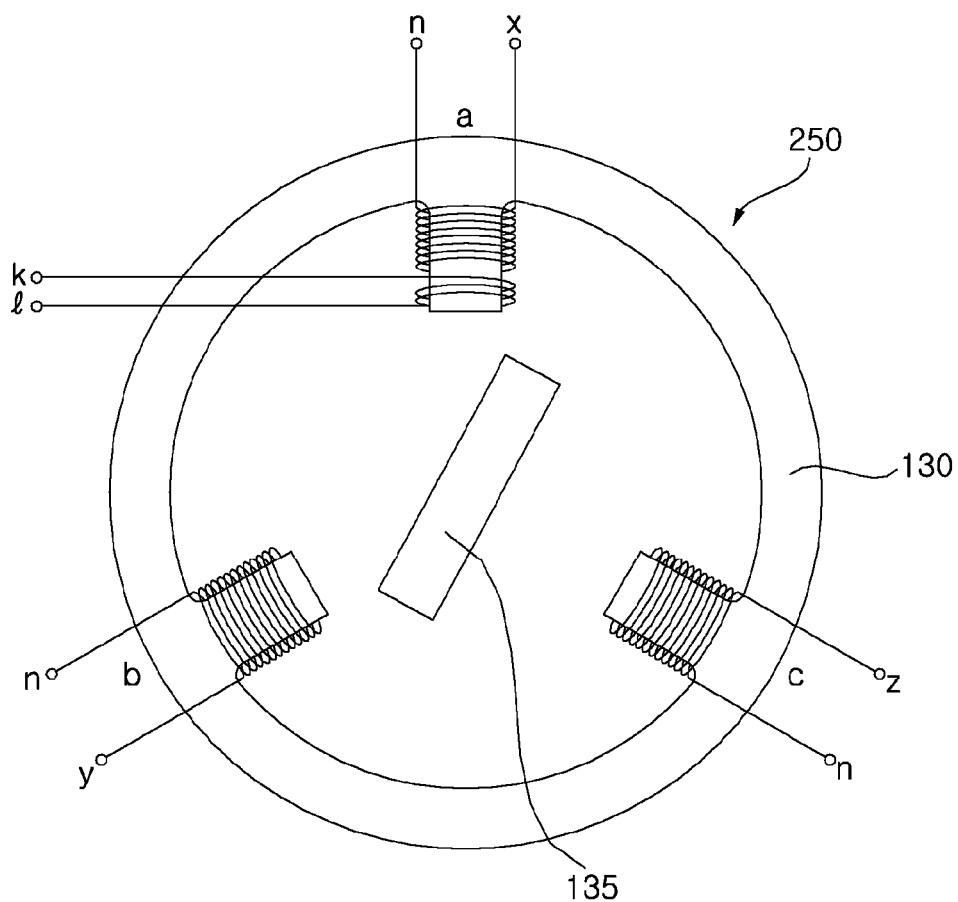
FIG. 4 is a diagram showing an example of the structure of a motor of FIG. 2.
Figure 5:
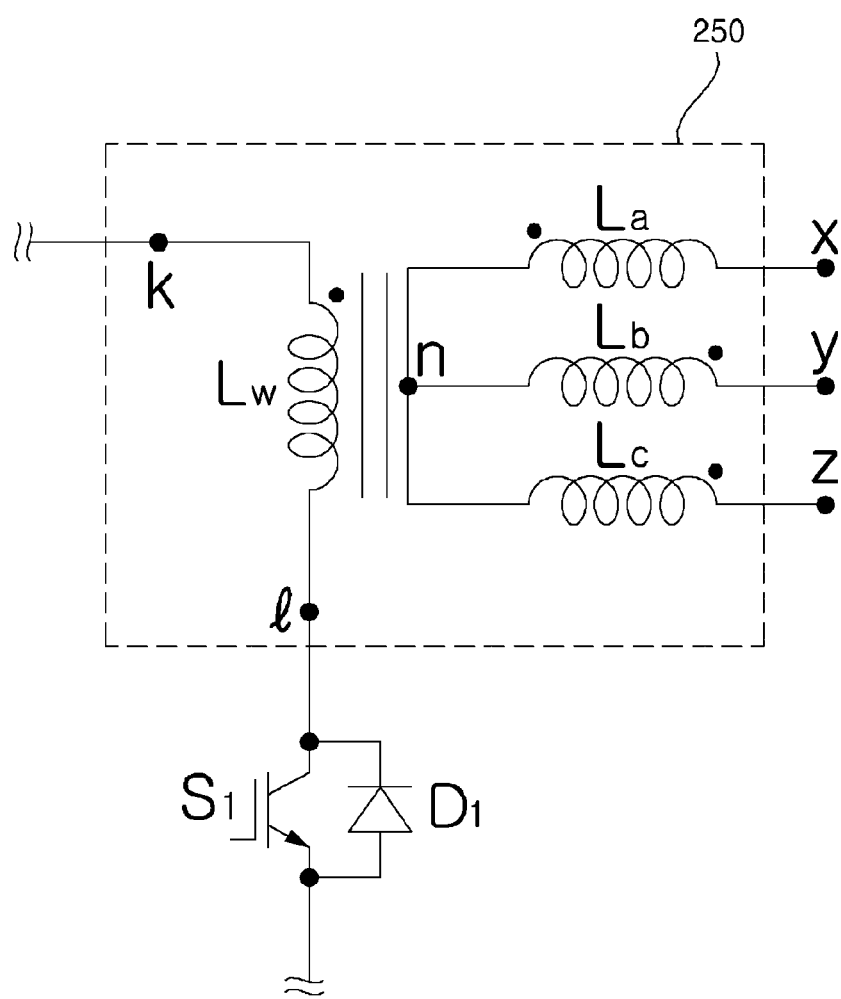
FIG. 5 is a diagram showing an example of an equivalent circuit of a motor of FIG. 4.

FIG. 4 shows an example of the structure of the motor of FIG. 2 and FIG. 5 shows an example of an equivalent circuit of the motor of FIG. 4.

Referring to FIG. 4, the motor 250 is a three-phase AC motor and includes a stator 130 of an a-phase, a b-phase and a c-phase and a rotator 135.

In the motor operation mode, PWM signals are input to coils wound on the stator 130 of the a-phase, the b-phase and the c-phase. Thus, the rotator 135 rotates by an electric field and a magnetic field.

In the motor 250, an additional coil may be wound on any one of the a-phase, the b-phase and the c-phase, for example, the a-phase stator, in addition to the phase coils.

In the figure, the a-phase coil is wound on the a-phase stator between a node x and a node n, the b-phase coil is wound on the b-phase stator between a node y and the node n, and the c-phase coil is wound on the c-phase stator between a node z and the node n. Here, the node n denotes a common neutral point of the a-phase, the b-phase and the c-phase.

In the figure, the additional coil is separated from the a-phase coil and is wound on the a-phase stator between a node k and a node l.

In addition to the phase coils, the additional coil may be used. That is, the additional coil is used as a primary side of a transformer of the flyback converter and the phase coil is used as a secondary side of the transformer.

The motor 250 may be expressed by the equivalent circuit shown in FIG. 5.

That is, between the node k and the node l, an inductor $L_w$ of the additional coil is used as the primary side of the transformer of the flyback converter and the switching element $S_1$ of the switching unit 410 may be connected to the node l.

Between the node x and the node n, between the node y and the node n and between the node z and the node n, the a-phase inductor $L_a$, the b-phase inductor $L_b$ and the c-phase inductor $L_c$ may be connected in parallel. Any one of the a-phase inductor $L_a$, the b-phase inductor $L_b$ and the c-phase inductor $L_c$, for example, the a-phase inductor $L_a$, is used as the secondary side of the transformer.

In the charging mode, all the switching elements $S_a$, $S'_a$, $S_b$, $S'_b$, $S_c$ and $S'_c$ of the inverter 420 may be turned off. Thus, the controller 430 may control turn-off of all the switching elements $S_a$, $S'_a$, $S_b$, $S'_b$, $S_c$ and $S'_c$ in the charging mode.

In the charging mode, since all the switching elements of the inverter are turned off, the rotor of the motor does not rotate.

The equivalent circuit of FIG. 5 may be referred to as a flyback converter, because the switching element $S_1$, the inductor $L_w$ of the additional coil, the a-phase inductor $L_a$ the b-phase inductor $L_b$ and the c-phase inductor $L_c$ operate in the flyback mode.

Figure 6A:
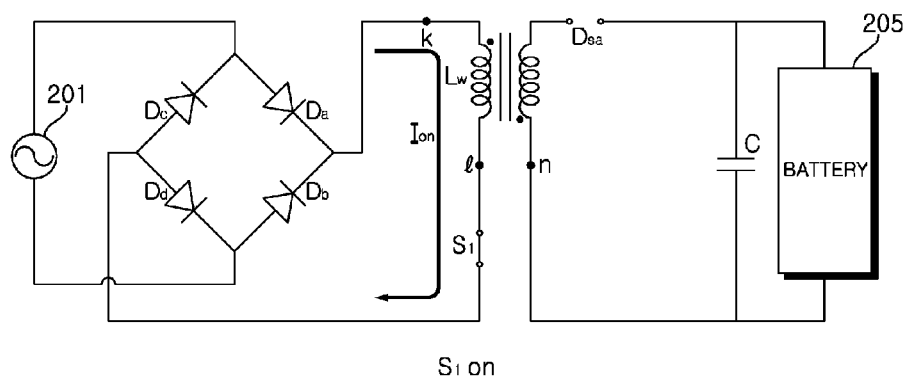
FIGS. 6a and 6b are views referred to for describing example operation of the circuit of FIG. 3.
Figure 6B:
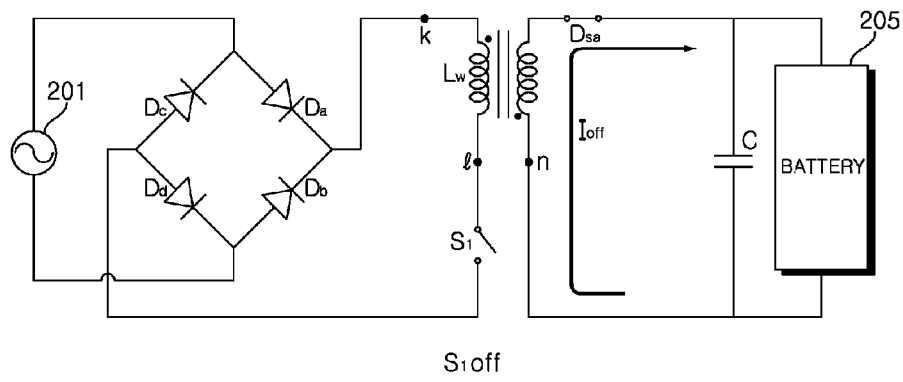

FIGS. 6a and 6b illustrate example operation of the circuit of FIG. 3.

First, FIG. 6a shows the case in which the equivalent circuit of the driving unit 200 of FIG. 5 operates in an energy accumulation mode of the charging mode as a flyback converter.

FIG. 6a shows the case in which, if the switching element $S_1$ is turned on, a closed loop is formed by the inductor $L_w$ of the additional coil and the switching element $S_1$ such that current $I_{on}$ flows. Accordingly, energy is accumulated in the inductor $L_w$ of the additional coil, that is, the primary side of the transformer, based on current $I_{on}$. At this time, the a-phase upper-arm switching element $S_a$ is turned off.

In the energy accumulation mode, induced current generated at the secondary side of the transformer does not flow due to the diode $D_{sa}$ connected to the a-phase upper-arm switching element $S_a$.

Next, FIG. 6b shows the case in which the equivalent circuit of the driving unit 200 of FIG. 5 operates in an energy open mode of the charging mode as a flyback converter.

FIG. 6b shows the case in which, if the switching element $S_1$ is turned off, current $I_{off}$ induced from energy stored in the inductor $L_w$ of the additional coil flows through the a-phase inductor $L_a$ and the diode $D_{sa}$ connected to the a-phase upper-arm switching element $S_a$ in inverse parallel. That is, a closed loop is formed by the a-phase inductor $L_a$ and the diode $D_{sa}$ such that current $I_{off}$ flows. Thus, energy generated due to the current $I_{off}$ is stored in the capacitor C and the battery 205. As a result, the converted DC voltage is stored in the battery 205.

As a result, the converted DC power is stored in the battery 205 by the on/off operation of the switching element $S_1$, that is, the PWM operation.

The voltage boosting operation or the voltage drop operation of the driving unit 200, that is, the charging apparatus 200, may be determined by comparison between the voltage across the capacitor C and the voltage across the capacitor $C_x$ provided at the output end of the rectifier 412.

The controller 430 may control the duty ratio of the turn-on of the switching element $S_1$ so as to perform the voltage boosting operation if the voltage across the capacitor $C_x$ is less than the voltage across the capacitor C. For example, it is possible to increase the duty ratio for voltage boost.

The controller 430 may control the duty ratio of the turn-on of the switching element $S_1$ so as to perform the voltage drop operation if the voltage across the capacitor $C_x$ is greater than the voltage across the capacitor C. For example, it is possible to decrease the duty ratio for voltage drop.

Figure 7:
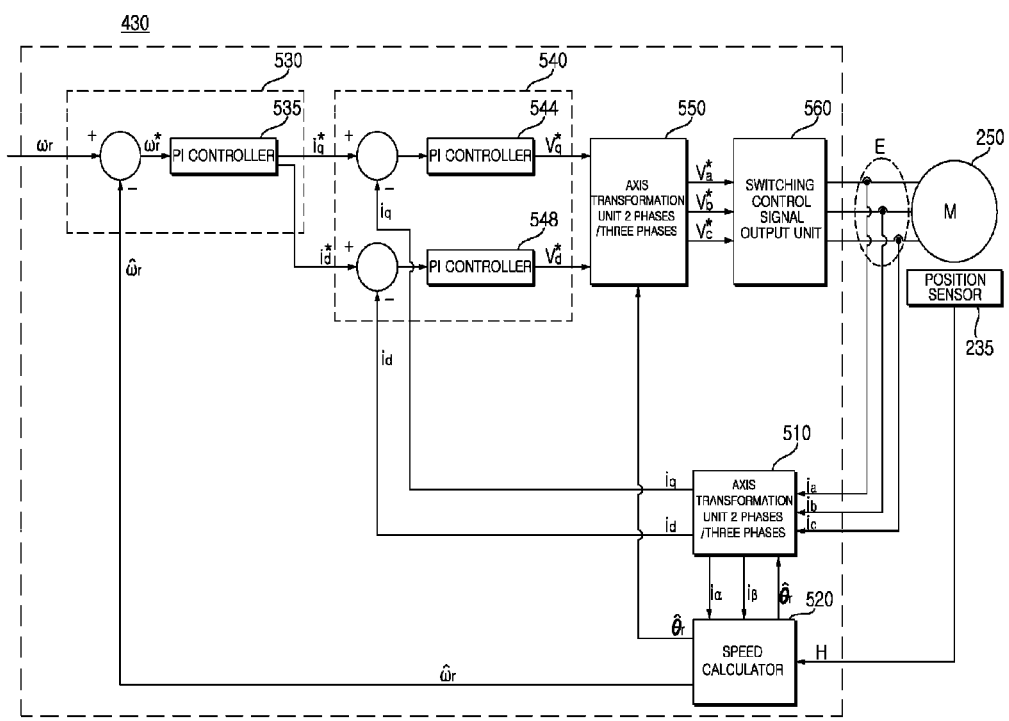
FIG. 7 is a block diagram showing an example of the internal configuration of a controller of FIG. 2.

FIG. 7 shows an example of the internal configuration of the controller of FIG. 3.

Referring to FIG. 7, the controller 430 may include an axis transformation unit 510, a speed calculator 520, a current command generator 530, a voltage command generator 540, an axis transformation unit 550 and a switching control signal output unit 560.

The axis transformation unit 510 receives and transforms three-phase output currents $i_a$, $i_b$ and $i_c$ detected by the output current detector E into two-phase currents $i_\alpha$ and $i_\beta$ of a stationary reference frame.

The axis transformation unit 510 may transform two-phase currents $i_\alpha$ and $i_\beta$ of the stationary reference frame into two-phase currents $i_d$ and $i_q$ of a rotating reference frame.

The speed calculator 520 may calculate a speed $\hat{\omega}_r$ based on the location signal H of the rotor received from the position sensor 235. That is, the speed calculator may calculate the speed by dividing the movement distance of the rotor by the time based on the location signal of the rotor.

The position sensor 235 may sense the location of the rotor of the motor 250. The position sensor 235 may include a hall sensor.

The speed calculator 520 may output the calculated location $\hat{\theta}_r$ and the calculated speed $\hat{\omega}_r$ based on the received location signal H of the rotor.

The current command generator 530 calculates a speed command value $\omega^*_r$ based on the calculated speed $\hat{\omega}_r$ and a target speed $\omega_r$ and generates a current command value $i^*_q$ based on the speed command value $\omega^*_r$. For example, the current command generator 530 may perform PI control of the PI controller 535 based on the speed command value $\omega_r$, which is the difference between the calculated speed $\hat{\omega}_r$ and the target speed $\omega_r$, and generate the current command value $i^*_q$. Although the q-axis current command value $i^*_q$ is shown as the current command value in the figure, the d-axis current command value $i^*_d$ may also be generated. in addition, the value of the d-axis current command value $i^*_d$ may be set to 0.

The current command generator 530 may further include a limiter for limiting the level of the current command value $i^*_q$ such that the current command value $i^*_q$ does not exceed an allowable range.

Next, the voltage command generator 540 generates d-axis and q-axis voltage command values $v^*_d$ and $v^*_q$ based on d-axis and q-axis currents $i_d$ and $i_q$ transformed to the two-phase rotating reference frame by the axis transformation unit and the current command values $i^*_d$ and $i^*_q$ of the current command generator 530. For example, the voltage command generator 540 may perform PI control of the PI controller 544 and generate the q-axis voltage command value $v^*_q$, based on a difference between the q-axis current $i_q$ and the q-axis current command value $i^*_q$. In addition, the voltage command generator 540 may perform PI control of the PI controller 548 and generate the d-axis voltage command value $v^*_d$, based on a difference between the d-axis current $i_d$ and the d-axis current command value $i^*_d$. The d-axis voltage command value $v^*_d$ may be set to 0 if the d-axis current command value $i^*_d$ is set to 0.

The voltage command generator 540 may further include a limiter for limiting the level of the d-axis and q-axis voltage command values $v^*_d$ and $v^*_q$ such that the d-axis and q-axis voltage command values $v^*_d$ and $v^*_q$ do not exceed an allowable range.

The generated d-axis and q-axis voltage command values $v^*_d$ and $v^*_q$ are input to the axis transformation unit 550.

The axis transformation unit 550 receives the location $\hat{\theta}_r$ calculated by the speed calculator 520 and the d-axis and q-axis voltage command values $v^*_d$ and $v^*_q$ and performs axis transformation.

First, the axis transformation unit 550 transforms the two-phase rotating reference frame into the two-phase stationary reference frame. At this time, the location $\hat{\theta}_r$ calculated by the speed calculator 520 may be used.

The axis transformation unit 550 transforms the two-phase stationary reference frame into the three-phase stationary reference frame. Through such transformation, the axis transformation unit 550 outputs three-phase voltage command values $v^*_a$, $v^*_b$ and $v^*_c$.

The switching control signal output unit 560 generates and outputs an inverter switching control signal $S_{ic}$ according to the pulse width modulation (PWM) method based on the three-phase output voltage command values $v^*_a$, $v^*_b$ and $v^*_c$.

The output inverter switching control signal $S_{ic}$ may be converted into a gate driving signal by a gate driving unit and may be input to the gates of the switching elements of the inverter 420. Thus, the switching elements $S_a$, $S'_a$, $S_b$, $S'_b$, $S_c$ and $S'_c$ of the inverter 420 perform the switching operation.

The controller 430 may control the switching operation of the switching element $S_1$ of the switching unit 410.

The charging apparatus and the electric vehicle including the same described throughout this disclosure are not restricted to the examples set forth herein. Therefore, variations and combinations of the examples set forth herein fall within the scope of the disclosure.

In some implementations, in the charging mode, the input AC voltage is converted into the DC voltage using the additional coil wound on the stator of any one phase of the motor, the switching unit, and the inverter, and is supplied to the battery. Accordingly, it may be possible to perform charging using the AC voltage.

In particular, when the charging apparatus operates in the charging mode, the switching element of the switching unit, the motor and the inverter operate in a flyback converter.

Since the charging apparatus operates as a flyback converter using only the additional coil and the switching element connected to the additional coil, it may be possible to reduce manufacturing costs.

In addition, in the charging mode, since all the switching elements of the inverter are turned off, the rotator of the motor does not move.

Since the inverter, the controller and the switching unit of the charging apparatus may be implemented on the same circuit board, it may be possible to implement a small-size charging apparatus.

The method for operating the charging apparatus may be implemented as code that is written to a processor-readable recording medium included in the charging apparatus and may thus be read by a processor. The processor-readable recording medium may be any type of recording device in which data can be stored in a processor-readable manner.

Although examples have been disclosed for illustrative purposes, those skilled in the art will appreciate that various modifications, additions and substitutions are possible, without departing from the scope and spirit of the disclosure and the accompanying claims.

What is claimed is:

1. A charging apparatus comprising:
   a converter configured to, in a charging mode, receive an input alternating current (AC) voltage and convert the input AC voltage into an output direct current (DC) voltage; and
   a controller configured to control the converter,
   wherein the converter includes:
      a motor that includes a stator and a rotator, and coils wound on the stator, the coils corresponding to different phases of the motor;
      an additional coil wound on a portion of the stator that corresponds to a phase of the different phases of the motor;
      a switching unit connected to the additional coil and configured to selectively supply the input AC voltage to the motor by performing a switching operation; and
      an inverter configured to, in a motor operation mode, convert a battery DC voltage from a battery into an output AC voltage by performing a switching operation of three-phase switching elements and drive the motor, and, in the charging mode, convert the input AC voltage into the output DC voltage using the additional coil of the motor and the switching unit and supply the output DC voltage to the battery.

2. The charging apparatus according to claim 1, wherein, in the charging mode, a switching element of the switching unit, the motor, and the inverter operate as a flyback converter.

3. The charging apparatus according to claim 1, wherein energy is stored in the additional coil by turning a switching element of the switching unit on and the stored energy is converted into the output DC voltage via the inverter and supplied to the battery by turning the switching element of the switching unit off.

4. The charging apparatus according to claim 1, wherein, in the charging mode, the additional coil of the motor operates as a primary side of a transformer and a phase coil wound with the additional coil on the same portion of the stator, which corresponds to a phase of the different phases of the motor, operates as a secondary side of the transformer.

5. The charging apparatus according to claim 1, wherein the controller is configured to, in the charging mode, control turning on and off of a switching element of the switching unit.

6. The charging apparatus according to claim 1, wherein the inverter, the controller, and the converter are located on a same circuit board.

7. The charging apparatus according to claim 6, wherein the controller is configured to, in the charging mode, turn off all of the three-phase switching elements of the inverter.

8. The charging apparatus according to claim 1, wherein the converter includes a rectifier configured to rectify the input AC voltage and supply the rectified voltage to the motor.

9. The charging apparatus according to claim 1, wherein the controller includes:
   a speed calculator configured to calculate rotator speed information of the motor based on a location signal of the rotator of the motor;
   a current command generator configured to generate a current command value based on the rotator speed information and a speed command value;
   a voltage command generator configured to generate a voltage command value based on the current command value and a detected current flowing in the motor; and
   a switching control signal output unit configured to output a switching control signal that drives the inverter based on the voltage command value.

10. The charging apparatus according to claim 1, wherein the controller is configured to control a duty ratio of turning on the switching unit to perform a voltage boosting operation based on a first voltage across a first capacitor located between the motor and a rectifier of the converter being less than a second voltage across a second capacitor located between the inverter and the battery, and configured to control the duty ratio of turning on the switching unit to perform a voltage drop operation based on the first voltage across the first capacitor being greater than the second voltage across the second capacitor.

11. An electric vehicle comprising:
   a battery; and
   a charging apparatus including a converter configured to, in a charging mode, receive an input alternating current (AC) voltage and convert the input AC voltage into an output direct current (DC) voltage and a controller configured to control the converter,
   wherein the converter includes:

a motor that includes a stator and a rotator, and coils wound on the stator, the coils corresponding to different phases of the motor;

an additional coil wound on a portion of the stator that corresponds to a phase of the different phases of the motor;

a switching unit connected to the additional coil and configured to selectively supply the input AC voltage to the motor by performing a switching operation; and an inverter configured to, in a motor operation mode, convert a battery DC voltage from a battery into an output AC voltage by performing a switching operation of three-phase switching elements and drive the motor, and, in the charging mode, convert the input AC voltage into the output DC voltage using the additional coil of the motor and the switching unit and supply the output DC voltage to the battery.

12. The electric vehicle according to claim 11, wherein, in the charging mode, a switching element of the switching unit, the motor, and the inverter operate as a flyback converter.

13. The electric vehicle according to claim 11, wherein the charging apparatus stores energy in the additional coil by turning a switching element of the switching unit on, and converts the stored energy into the output DC voltage via the inverter and supplies the converted DC voltage to the battery by turning the switching element of the switching unit off.

14. The electric vehicle according to claim 11, wherein, in the charging mode, the additional coil of the motor operates as a primary side of a transformer and a phase coil wound with the additional coil on the same portion of the stator, which corresponds to a phase of the different phases of the motor, operates as a secondary side of the transformer.

15. The electric vehicle according to claim 11, wherein the controller is configured to, in the charging mode, turn on and off all of the three-phase switching elements of the switching unit.

16. The electric vehicle according to claim 11, wherein the inverter, the controller, and the switching unit are located on a same circuit board.

17. The electric vehicle according to claim 16, wherein the controller is configured to, in the charging mode, turn off all of the three-phase switching elements of the inverter.

18. The electric vehicle according to claim 11, wherein, the converter includes a rectifier configured to rectify the input AC voltage and supply the rectified voltage to the motor.

19. The electric vehicle according to claim 11, wherein the controller includes:

a speed calculator configured to calculate rotator speed information of the motor based on a location signal of the rotator of the motor;

a current command generator configured to generate a current command value based on the rotator speed information and a speed command value;

a voltage command generator configured to generate a voltage command value based on the current command value and a detected current flowing in the motor; and a switching control signal output unit configured to output a switching control signal that drives the inverter based on the voltage command value.

20. The electric vehicle according to claim 11, wherein the controller is configured to control a duty ratio of turning on the switching unit to perform a voltage boosting operation based on a first voltage across a first capacitor located between the motor and a rectifier of the converter being less than a second voltage across a second capacitor located between the inverter and the battery, and configured to control the duty ratio of turning on the switching unit to perform a voltage drop operation based on the first voltage across the first capacitor being greater than the second voltage across the second capacitor.

\* \* \* \* \*